P. G. CAMPBELL.
AGITATING DEVICE.
APPLICATION FILED NOV. 3, 1919.
1,349,492.
Patented Aug. 10, 1920.
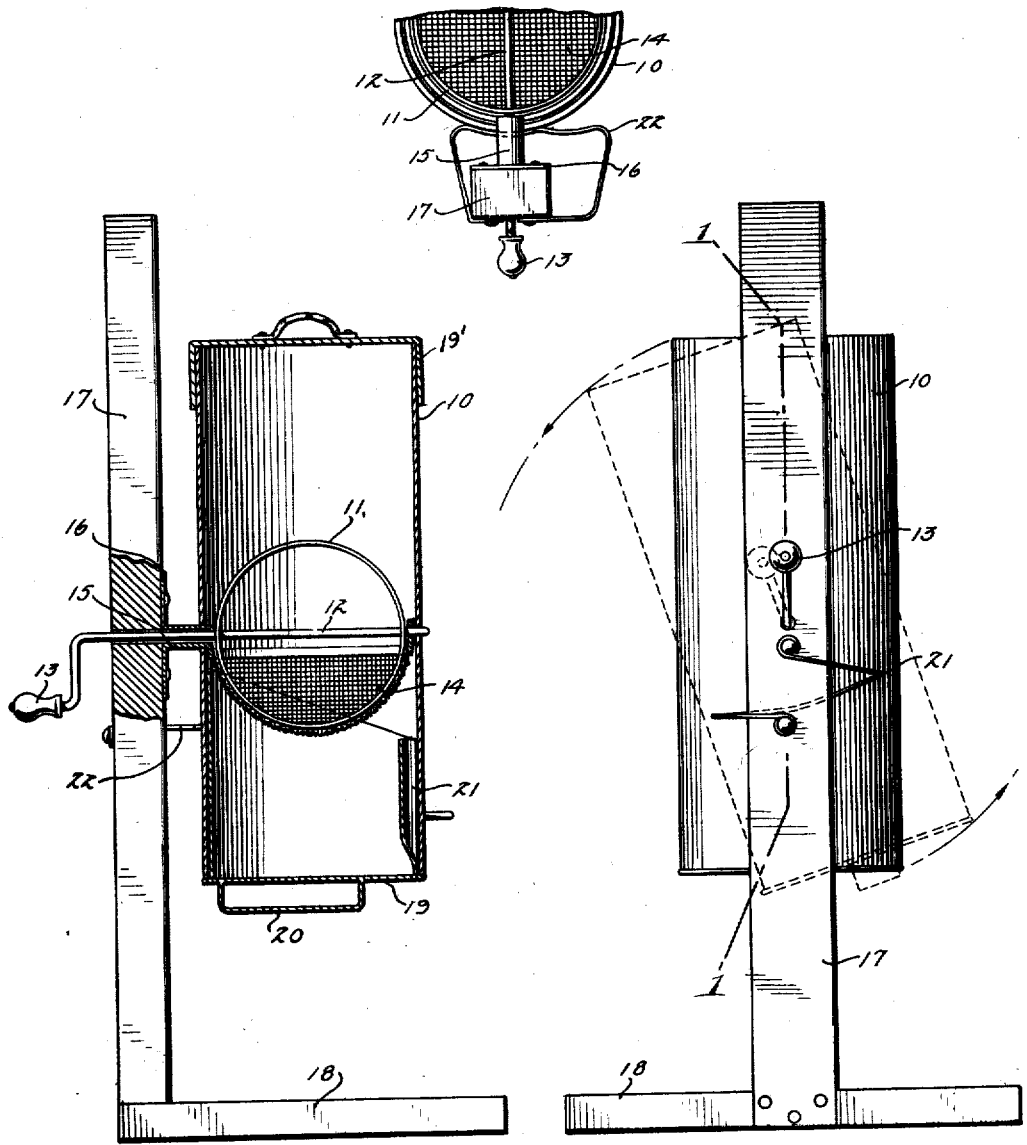
INVENTOR
PATRICK GEORGE CAMPBELL.
BY
ATTORNEYS

D STATES PATENT OFFICE.

PATRICK GEORGE CAMPBELL, OF MONOLITH, CALIFORNIA.

AGITATING DEVICE.

1,349,492.　　　　Specification of Letters Patent.　　Patented Aug. 10, 1920.

Application filed November 3, 1919. Serial No. 335,319.

*To all whom it may concern:*

Be it known that I, PATRICK GEORGE CAMPBELL, a citizen of the United States, and a resident of Monolith, in the county of Kern and State of California, have invented a new and Improved Agitating Device, of which the following is a full, clear, and exact description.

The present invention relates in general to agitating devices and particularly to that class of such devices which are used as a kitchen utensil for sifting flour and the like.

The primary object of the invention is to provide an agitating device of the character described with which better results may be realized in preparing flour for bread-making, particularly where the device is employed for mixing baking powder with the flour.

It is well known that in making bread, pastries and the like better results are to be had if the baking powder is thoroughly mixed with the flour before the liquid is added to the flour. The present invention, therefore, proposes to so construct the device that a quantity of flour and baking powder may be placed in a receptacle and so agitated that there will be no doubt as to the thorough mixing of these two constituents.

The accompanying drawing illustrates one embodiment of the invention, and in which—

Figure 1 is a vertical sectional view on the line 1—1 of Fig. 2;

Fig. 2 is a side elevation; and

Fig. 3 is a plan view of a part of the device.

Referring to the drawings in detail, 10 represents a relatively tall, cylindrical receptacle and open at both ends. Mounted within and about midway the open ends of the receptacle 10 is a rotatable agitator 11 having a manipulating spindle 12, one end of which having a bearing in the side of the receptacle 10, with this opposite end extending past the side of the receptacle and terminating in a manipulating handle 13. Also located within the receptacle 10 is a fixed sifter 14, which is preferably cup-shaped, as shown, and supported at one edge on the spindle 12 of the agitator 11, the opposite edge of the same terminating in an upwardly presented sleeve 15 providing an elongated bearing for the spindle 12, the ends of the bearing being outwardly presented to provide attaching flanges 16 for mounting the device to the side of the support 17, which support is provided with a base 18. The spindle 12 of the agitator 11 extends through an opening in the side of the support 17, which is made coaxial with the bearing 15 so that the agitator may coact with the sifter 14 in acting upon the flour.

The receptacle 10 is rotatably mounted relative to the fixed sifter 14, the mounting thereof comprising the bearing for the end of the spindle 12, and the opposite side of the receptacle having an opening made to receive the bearing 15. Thus mounted, the receptacle is capable of being rotated around the sifter 14, the purpose of which will be presently described.

Covers 19 and 19' are provided for closing the ends of the receptacle 10 so that the receptacle may be reversed thus causing the flour to be agitated through the sifter a number of times before releasing the same into the receptacle supported on the base 18 and below the open end of the receptacle.

The cover 19 in its preferred form comprises a container adapted to telescope within the receptacle and receiving the material agitated through the sifter 14. A handle 20 is provided for manipulating the container, and the container is further provided with an air by-pass 21 inclosing the end of the receptacle to discharge of flour but permitting the escape of air therefrom. This will prevent the air escaping and carrying with it particles of flour.

To maintain the receptacle upright, a spring device 22 is provided on the support 17 with which the receptacle has a wiping contact in being reversed.

Having thus described my invention, I claim as new and desire to secure by Letters Patent:—

In an agitating device, a revoluble receptacle, a support on which the receptacle is mounted with freedom of rotation, a spring tension catch on the support for automatically maintaining the receptacle in an upright position, a sifter fixed to the support and around which the receptacle is capable of being rotated, an agitator in the receptacle adapted to coact with the sifter, and a cover for one end of the receptacle comprising a container adapted to telescope within the receptacle and receive the material agitated through the sifter.

PATRICK GEORGE CAMPBELL.